United States Patent
Furuyama

[11] Patent Number: 5,980,119
[45] Date of Patent: Nov. 9, 1999

[54] SINGLE-CRYSTAL COMPONENT TO BE APPLIED TO OPTICAL MODULE AND ITS FABRICATION METHOD

[75] Inventor: Hideto Furuyama, Yokohama, Japan

[73] Assignee: Kabushiki Kaisha Toshiba, Kawasaki, Japan

[21] Appl. No.: 08/917,892

[22] Filed: Aug. 27, 1997

[30] Foreign Application Priority Data

Aug. 29, 1996 [JP] Japan .................................. 8-228265

[51] Int. Cl.[6] .............................. G02B 6/00; G02B 6/36
[52] U.S. Cl. ............................................................ 385/89
[58] Field of Search .................................. 385/51, 80, 83, 385/137, 143; 438/427, 675; 257/374, 510, 648; 430/316

[56] References Cited

U.S. PATENT DOCUMENTS

| | | | |
|---|---|---|---|
| 4,394,196 | 7/1983 | Iwai | 438/296 |
| 4,472,240 | 9/1984 | Kameyama | 438/427 |
| 4,821,997 | 4/1989 | Zdeblick . | |
| 4,897,711 | 1/1990 | Blonder et al. . | |
| 5,559,918 | 9/1996 | Furuyama et al. . | |
| 5,812,726 | 9/1998 | Jinnai et al. | 385/137 |

FOREIGN PATENT DOCUMENTS

| | | |
|---|---|---|
| 0505197 | 9/1992 | European Pat. Off. . |
| 0596613 | 5/1994 | European Pat. Off. . |
| 0704732 | 4/1996 | European Pat. Off. . |

*Primary Examiner*—Akm E. Ullah
*Attorney, Agent, or Firm*—Finnegan, Henderson, Farabow, Garrett & Dunner, L.L.P.

[57] ABSTRACT

To provide a single crystal component comprising a single crystal substrate whose surface portion and depth direction are defined, a tapered groove formed on the surface portion of the single crystal substrate and having an opening and a cross-sectional shape gradually narrowed along the depth direction, and a protrusion formed on the groove nearby the surface portion of the single crystal substrate.

15 Claims, 11 Drawing Sheets

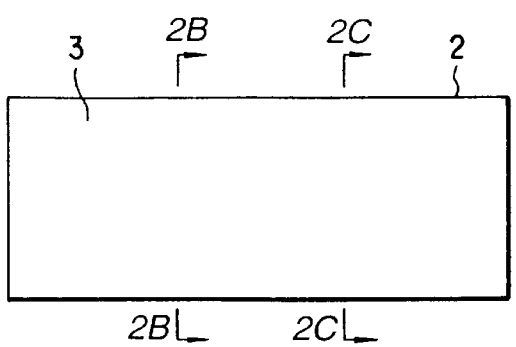
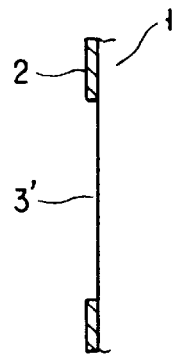
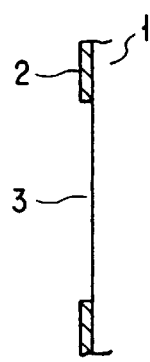
F I G. 2A
PRIOR ART
F I G. 2B
PRIOR ART
F I G. 2C
PRIOR ART
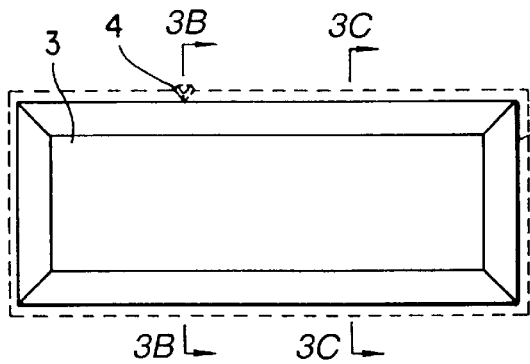
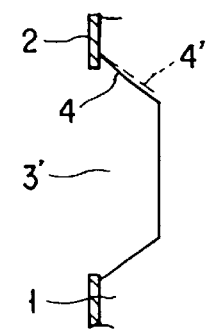
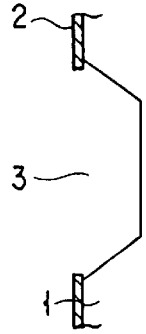
F I G. 3A
PRIOR ART
F I G. 3B
PRIOR ART
F I G. 3C
PRIOR ART
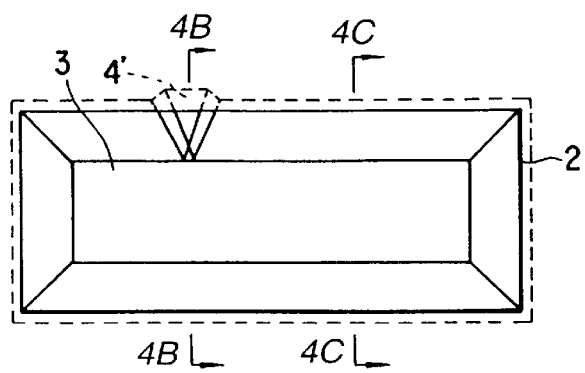
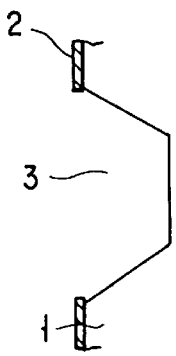
F I G. 4A
PRIOR ART
F I G. 4B
PRIOR ART
F I G. 4C
PRIOR ART

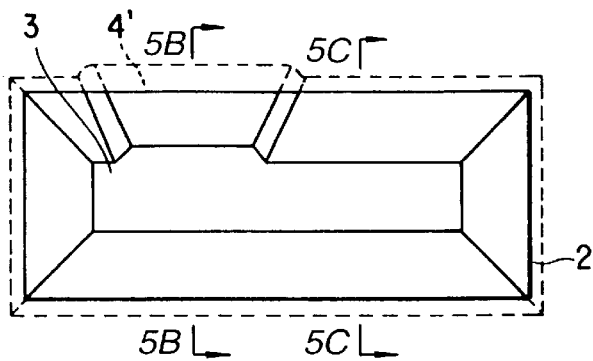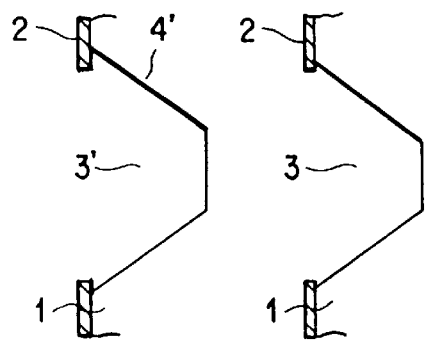
FIG. 5A
PRIOR ART
FIG. 5B
PRIOR ART
FIG. 5C
PRIOR ART
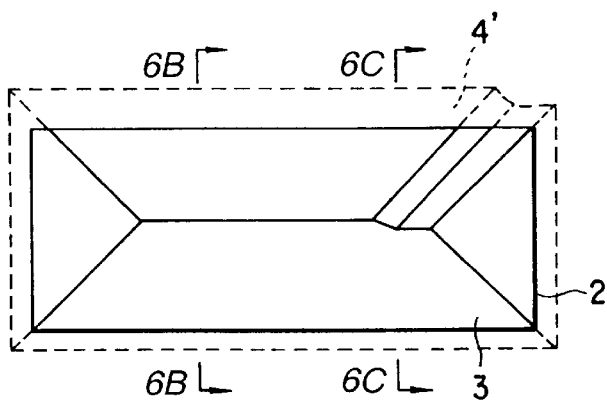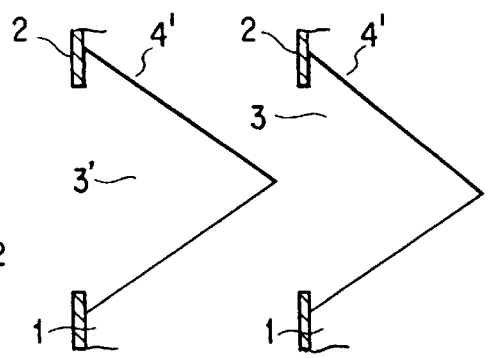
FIG. 6A
PRIOR ART
FIG. 6B
PRIOR ART
FIG. 6C
PRIOR ART

SINGLE-CRYSTAL COMPONENT TO BE APPLIED TO OPTICAL MODULE AND ITS FABRICATION METHOD

BACKGROUND OF THE INVENTION

The present invention relates to a single-crystal component to be applied to an optical component such as an optical module and its fabrication method.

A single-crystal substrate made of Si or the like has the crystal orientation dependency of an etching rate due to the anisotropy of an atomic arrangement. Because of this characteristic, the single-crystal substrate makes it possible to form a geometric shape reflecting a crystal structure through etching by selecting a proper etching species. This is the so-called anisotropic etching which is practically used for various semiconductor processes and the micro-machining art for fabricating a micro mechanism on a substrate.

The anisotropic etching has been recently noticed as a technique for machining an optical mounting component requiring a high-accuracy machining. As an example of applying the anisotropic etching to an optical mounting component, there is an example of working a V-groove for holding an optical fiber on an Si substrate. This example has a feature that it is superior in working accuracy and mass productivity compared to an example of using mechanical cutting. As the reasons, it is possible to perform control in submicrons because a semiconductor process is used and work a lot of Si wafers at the same time because tens of Si wafers can be treated (worked) at the same time by incorporating a lot of workpieces into the Si wafers similarly to the case of an IC chip. Moreover, because the semiconductor process is used, it is possible to easily form a wiring electrode on a substrate and there is an advantage that machining and electrical wiring can be performed at the same time or in a series of processes.

However, these arts have problems caused by using a semiconductor process. That is, because the semiconductor process mainly performs the so-called thin-film formation, there is a practical restriction in the forming range and therefore, the process is not suitable for the machining having a large step. In general, a step in a substrate allowed in the semiconductor process is 10 $\mu$m or less. Even when only forming a mask pattern on the surface to form a groove, the semiconductor process is restricted to the machining for a step of up to approx. 100 $\mu$m in most cases. This is because the semiconductor process purposes the machining of micron order and thereby, it cannot correspond to an extremely large step machining.

In general, dry etching frequently used for the semiconductor process cannot perform a very deep etching because the etching rate is relatively small and due to an economic restriction on working time because treatment is performed in accordance with the single wafer processing. In this case, a practically possible etching depth is approx. 50 to 100 $\mu$m. Moreover, in the case of the wet etching having a relatively large etching rate and easily allowing batch processing, a very deep etching is theoretically possible. In this case, however, there is a problem that a micro shape deformation due to etching irregularity or crystal defect spreads as etching progresses. Therefore, an etching depth is restricted to a certain value in view of the working yield. The then depth is approx. 100 $\mu$m as described above and this is described while referring to the accompanying drawings.

FIGS. 1A to 1C are sectional views of processes showing a working example according to the conventional anisotropic etching. FIGS. 1A to 1C show a case in which a single crystal substrate uses Si as a typical example used for micro-machining. In FIGS. 1A to 1C, symbol 1 denotes a single-crystal Si substrate, 2 denotes an etching mask, and 3 denotes an etched portion. In the case of the anisotropic etching of Si, the mask 2 uses an oxide film or nitride film such as $SiO_2$ or $Si_3N_4$ and an etching solution uses a KOH solution or hydrazine having a high crystal-orientation dependency of etching rate. FIGS. 1A to 1C show sectional views when the surface of the Si substrate 1 has (100) plane and the etched portion 3 has a rectangular opening having <110> and <1–10> directions on the surface of a Si substrate.

First, FIG. 1A shows a state in which the mask 2 is formed on the Si substrate 1 and patterning of photoresist and transfer of the pattern to the mask are completed. FIG. 1B shows a state in which the mask 2 is put in an etching solution and etching is currently performed. Single-crystal Si has a property that the etching rate on (111) plane is smaller than that of other crystal planes. Therefore, when starting etching from (100) plane, etching progresses in a shape exposing (111) slope continued from a mask boundary as shown in FIG. 1B.

In this case, symbol 4 denotes an abnormally etched portion caused by etching irregularity or crystal defect, which is an etching defect produced when the boundary between the mask 2 and the substrate surface is locally quickly etched. This abnormal etching is observed when a foreign matter enters the boundary between a substrate and a mask or there is a crystal defect on a substrate or when an etching solution is irregularly agitated or the solution causes an abnormal flow due to bubbles, and occurs though there is no mask shape defect apparently. It is a matter of course that an etching shape is deformed when there is a defect on a mask pattern. However, this factor is another problem because it is related to imperfect formation of a mask pattern.

Moreover, when the linear portion of the above mask has a deviation from the crystal orientation, a cyclic discontinuous boundary for eliminating a directional deviation between the crystal plane and the mask appears on the etching slope, causing the same result as the case of the abnormal etching. However, this is also another problem. Therefore, an etching yield represents a factor due to abnormal etching. Thus, description is hereafter made by omitting a defect and orientational deviation of a mask pattern.

FIG. 1C shows a state in which etching is further progressed up to a depth where (111) planes at the both sides of the mask collide with each other. In this case, a normal portion becomes a V shape symmetric to the mask 2 at right and left. However, at a portion (4') formed because the shape deformation shown by symbol 4 due to abnormal etching is progressed, not only the center of the V shape is deviated but also the width of the V-groove is increased. Moreover, the abnormal etching not only locally progresses in the depth direction but also causes a critical problem that the entire shape is deformed by actually progressing in the transverse direction. This is described by referring to FIGS. 2A to 2C to FIGS. 6A to 6C.

FIGS. 2A to 2C to FIGS. 6A to 6C are illustrations showing the etching states shown in FIGS. 1A to 1C viewed from the upper sides and by making the cross sections of abnormal and normal portions correspond to the states respectively and moreover show the cross sections of A (abnormally etched portion) and B (normally etched portion) attached to the upper sides of the drawings at the right respectively. Moreover, a portion same as that in FIGS. 1A to 1C is provided with the same symbol.

FIGS. 2A to 2C show a state in which a mask is formed similarly to the case of FIG. 1A, FIGS. 3A to 3C show a state in which etching is currently performed similarly to the case of FIG. 1B, and FIGS. 3A to 3C show an initial state in which the defect 4 (abnormally etched portion) is produced. Though the degree of collapse of the etching shape is small at this stage, the etching rate is easily accelerated because the cross section of the abnormally etched portion protruded beyond (111) plane (4″) extended from a mask end.

Therefore, the abnormally etched portion does not spread proportionally to the entire etching progress but it first progresses in the depth direction (FIGS. 4A to 4C) and simultaneously spreads in the transverse direction. Moreover, when the spread of the abnormally etched portion reaches to a certain extent, the etching in the depth direction catches up with the depth of the normally etched portion (FIGS. 5A to 5C). Thereafter, etching progresses in the depth direction at the abnormally etched portion similarly to the normally etched portion. In this case, however, spread in the transverse direction also progresses at the abnormally etched portion.

Finally, even when the normally etched portion completely becomes V-shape, etching progresses so as to form an eccentric deeper V-groove at the abnormally etched portion. Even after the abnormally etched portion becomes V-shape, spread in the transverse direction progresses (FIGS. 6A to 6C). If the etching is continued under the above state, a single V-groove whose center is deviated as a whole is finally formed at the width of the V-shape of the abnormally etched portion. Therefore, an initial slight abnormal etching would finally result in an essential problem causing a predetermined etching shape to greatly deform.

Though the above abnormal etching does not frequently occur when etching is relatively shallow, it occurs considerably frequently when deep etching is performed. Though depending on an etching condition, abnormal etching does not frequently occur up to approx. 100 μm. However, abnormal etching occurs considerably frequently in the case of deep etching such as 300 μm or more. Moreover, abnormal etching does not occur at a single portion as described above but it may occur at many portions in most cases once it starts. Therefore, it is frequently possible to decide whether abnormal etching occurs even through relatively macro observation of an etching state.

FIG. 7 shows an optical mounting component using anisotropic etching, which is an example for specifically showing the influence of the above abnormal etching. In FIG. 7, symbol 1 denotes a Si substrate, 3 denotes a relatively deep V-groove, 5 denotes a relatively shallow V-groove, and 7 denotes an electrode metal for mounting an optical device. In this case, the relatively deep V-groove 3 and the relatively shallow V-groove 5 are used to mount different members requiring position matching each other on the same substrate and aligning them and moreover, the shallow V-groove 5 is used to hold an optical fiber and the deep V-groove 3 is used to hold a guide pin of an optical connector. For example, an optical fiber having a diameter of 125 μm is combined with a guide pin having a diameter of 700 μm. In this case, when assuming the surface of the Si substrate as a reference position, the shallow groove requires a depth of 62.5 μm or more and the deep groove requires a depth of 350 μm or more.

FIGS. 8A to 8C show a case of simply etching two groove at the same time. To make the centers of the optical fiber and guide pin level with the Si substrate surface on the basis of the Si substrate surface, it is necessary that the surface width of the V-groove is set to approx. 153 μm for the optical fiber and approx. 857 μm for the guide pin.

Moreover, it is necessary to set the etching mask 2 to a value obtained by subtracting an undercut value of the etching corresponding to an etching time from the above width.

An etching mask is patterned in accordance with the above design as shown in FIG. 8A to apply anisotropic etching. In the case of the above setting, a narrow V-groove is completely formed into a V shape before 108 μm when the etching depth reaches approx. 108 μm or the mask width 5 is slightly narrowed by considering the subsequent undercut (FIG. 8B). At this stage, most portions are normal because etching is relatively shallow and therefore, the yield of etching hardly becomes an issue.

The above-described abnormal etching is frequently recognized when the etching depth is approx. 200 μm from experiences. Therefore, it is estimated that a portion serving as the species of abnormal etching is produced at the point of time in FIG. 8B or earlier point of time after the point of time in FIG. 8B. Hereafter, etching is continued until a wide V-groove has a depth of at least 350 μm. However, because etching is deep, the abnormal-etching occurrence rate also increases and the number of wide V-grooves having an abnormally etched portion 4′ increases as shown in FIG. 8C. Also, the number of narrow V-grooves 5 having an abnormally etched portion increases because they are exposed to an etching solution for a long time. As the result of experiments by the present inventor et al., though a test of simultaneously etching 10 or more Si wafers was performed more than ten times, the percent non-defective in which both grooves were normally etched did not reach several percents. Though changing several etching conditions, the same result was obtained and the correlations between wafer planes, between wafers, and between lots were not very significant.

FIGS. 9A to 9D show an improved example for preventing the yield from decreasing due to defects of the narrow V-grooves of the related art shown in FIGS. 8A to 8C. As shown in FIGS. 9A to 9D, a narrow V-groove 5 and a wide V-groove 3 are separately worked and there is a feature that a trouble due to a defect of the narrow V-groove 3 though the wide V-groove 5 is normal can be eliminated. In this case, it is necessary to form an etching mask two times. However, because the narrow V-groove 5 is protected by the second-time etching mask 2′ after relatively wide etching, it is almost prevented to cause abnormal etching due to exposure to an etching solution for a long time. Therefore, the percent defective of the narrow (shallow) V-groove 5 can be extremely decreased and the overall yield can be improved.

However, even in the case of this method, the yield of the wide (deep) V-groove did not change. Therefore, the overall etching yield was not very large and a percent non-defective of only approx. 10% was obtained even in a relatively preferable case. Moreover, in the case of this method, the etching time increases and the process cost increases because the grooves are worked separately from each other and furthermore, a trouble may occur due to misalignment between the fist-time and second-time masks.

To shorten the etching time, there is a method of providing the second-time mask for the portion in FIG. 8B and shifting to FIGS. 9C and 9D. However, the problem of misalignment is the same as the case of the conventional example in FIGS. 9A to 9D and the yield of the deep groove 3 is still a problem. In any case, in the case of the conventional anisotropic etching method, the process yield due to abnormal etching become an issue when deep etching of 300 μm or more is necessary.

Thus, conventionally, there is a problem that working requiring a deep groove is very difficult because a practical etching depth is up to approx. 100 μm even by using anisotropic etching to form a single-crystal component.

It is an object of the present invention to provide a single-crystal component and its fabrication method making it possible to realize deep etching of 300 μm or more at a preferable reproducibility and a high yield in the case of single crystal Si and improve the working accuracy of a groove through etching, and moreover provide an optical component and an optical module.

BRIEF SUMMARY OF THE INVENTION

In the case of the present invention, an mask end when performing deep etching is provided for a crystal plane having a small etching rate. The present invention uses a theory that abnormal etching does not easily occur at a mask end because the etching rate of a crystal plane contacting the mask end is small and even if abnormal etching occurs, it slowly progresses in the plane direction because the etching rate on the crystal plane is small and therefore, a working shape is not greatly deformed. This is based on the result of finding through earnest observation by the present inventor et al. that the above-described abnormal etching occurs at the interface between a mask and a crystal in most cases. Moreover, the present inventor confirms that no abnormal etching occurs for etching with a depth of 100 μm but abnormal etching starts for etching with a depth of 200 μm, and it securely occurs for etching with a depth of more than 300 μm.

In the case of the present invention, the etching process is executed by dividing it into two or more steps. First, the first-time anisotropic etching is stopped before a predetermined etching depth, that is, before a depth at which no abnormal etching occurs or which does not practically matter, then the second-time anisotropic etching is performed so that a mask interface is located at the crystal plane exposed due to the first-time anisotropic etching and having a small etching rate. Moreover, it is necessary to perform the third-time etching downward by considering the durability of a mask or the combination with another process and forming a mask similarly to the case of the second-time etching.

In the case of the present invention, it is necessary to perform etching by the same method as the related art up to a certain depth in order to specify a working shape by anisotropic etching and expose a crystal plane having an etching rate small by a value for forming a mask. However, it is necessary to stop the etching before a depth at which no abnormal etching occurs or which does not practically matter as described in the related art. Moreover, in the case of the present invention, because etching is performed by dividing it into two steps or more, it seems that misalignment occurs between the first-time etching and the second-time etching downward. However, as to be described later, the present invention is characterized in that no misalignment occurs because the second-time mask has an effect that a pattern self-aligns for the first-time mask.

Thus, the present invention makes it possible to exclude or practically control the deformation of an etching shape due to abnormal etching and greatly improve the process yield for deep anisotropic etching. Moreover, a protrusion protruded nearby the opening of a groove of the present invention has a function for preventing a resin from being omitted when the resin is embedded in the groove or more securely fixing a guide pin or the like by an adhesive.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2C are process sectional views showing a working example according to a conventional anisotropic etching method;

FIGS. 3A to 3C are process sectional views showing a working example according to a conventional anisotropic etching method;

FIGS. 4A to 4C are process sectional views showing a working example according to a conventional anisotropic etching method;

FIGS. 5A to 5C are process sectional views showing a working example according to a conventional anisotropic etching method;

FIGS. 6A to 6C are process sectional views showing a working example according to a conventional anisotropic etching method;

DETAILED DESCRIPTION OF THE INVENTION

Details of the present invention are described below by referring to illustrated embodiments. First, the basic process procedure is described as the first embodiment by referring to FIGS. 10A to 10D and specific examples compared with conventional examples are shown in the second embodiment downward. Moreover, the preferred embodiments show a case in which a single crystal substrate uses Si similarly to the case of the related art. However, the present invention can be applied to other single crystal substrates such as various types of semiconductor substrates made of, for example, Ge and SiC and various types of dielectric substrates made of, for example, $Al_2O_3$ and $Si_3N_4$ by properly selecting mask a material and an etching species.

First Embodiment

Figure 10A:
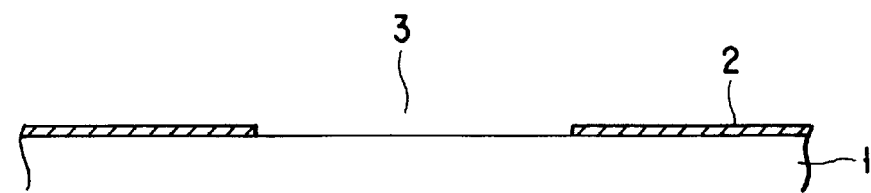
FIGS. 10A to 10D are sectional views showing fabrication processes of the single crystal component of the first embodiment of the present invention.

FIGS. 10A to 10D are process sectional views showing a fabrication method for the single crystal component of the first embodiment of the present invention. In FIGS. 10A to 10D, symbol 1 denotes a single-crystal Si substrate with the surface of (100) plane and 2 denotes a first etching mask. The etching mask 2 can use an $SiO_2$ film or an $Si_2N_4$ film. In the case of this example, the mask 2 is shown as a thermal oxide film ($SiO_2$ film) obtained from high-temperature oxidation of the Si substrate 1. Thermally oxidized $SiO_2$ is formed when surface elements of an Si substrate combine with the oxygen in the water vapor environment by performing heat treatment at, for example, 1,100° C. in an oxygen gas environment or water vapor environment using oxygen gas as a carrier. A photoresist pattern is formed on an $SiO_2$ film by applying the so-called photolithography to the Si substrate on which a thermal oxide film is formed by the above technique. Then, by transferring this to an $SiO_2$ film through dry etching or wet etching using a dilute hydrofluoric-acid solution and removing the photoresist, the state in FIG. 10A is obtained.

Figure 10B:
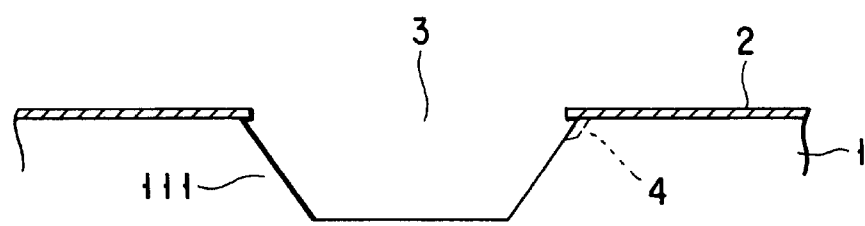

FIG. 10B shows a state of applying first anisotropic etching onto the substrate 1. This etching can be performed in the same manner as the case of the prior art so as to be a relatively shallow etching until the depth comes to, for example, 70 µm by using hydrazine or a KOH aqueous solution. In this case, (111) crystal plane (etching slope) comes to approx. 50 µm in terms of the width when projected on a mask plane and has a width enough to locate a mask boundary in the next process. As described in the section of Relate Art, occurrence of abnormal etching hardly matters in a relatively shallow etching up to approx. 100 µm. Therefore, it is a matter of course that the etching of 70 µm in this case does not matter.

According to the study by the present inventor, it is confirmed that no abnormal etching occurs for etching of 100 µm, abnormal etching starts for etching with a depth of 200 µm, and abnormal etching securely occurs for etching with a depth of 300 µm.

Even if the abnormally etched portion 4 occurs at a depth of 100 µm or less, the portion 4 is confined at the bottom of the second mask in the next process. Therefore, etching cannot further progress and it does not practically matter.

Then, the second mask 2' for performing deep etching is formed. In this case, it is permitted to leave the first mask 2. However, because a visor of the first mask 2 is formed due to undercut at the bottom of the mask through the first anisotropic etching, it may interrupt the next photolithography. Therefore, the first mask 2 is removed by a fluoric-acid solution or the like to form an $SiO_2$ film serving as the second mask 2' by thermally oxidizing an Si substrate similarly to the case of the first mask 2.

Figure 10C:
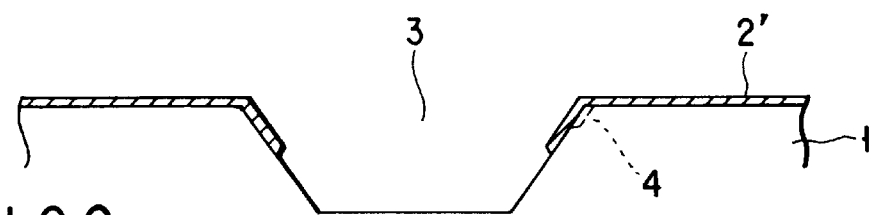

Thereafter, photolithography is performed to pattern a mask. In this case, the pattern is formed so that the boundary of a pattern opening is located on the etching slope formed by the first anisotropic etching as shown in FIG. 10C. Therefore, the mask is set so that the opening boundary to the first mask becomes narrow by a predetermined value, for example, so that the extension value of the second mask to the first anisotropic etching pattern comes to 20 µm for each side at an opening width of 40 µm.

In this case, an end of the mask pattern has a gap of approx. 30 µm from the surface and therefore, the pattern shape accuracy may be deteriorated depending on the performance of a mask aligner (photoresist exposing apparatus) used. However, the value is approx. several microns in the case of a normal mask aligner and therefore, it rarely exceeds 20 µm set here. Even if the value exceeds 20 µm, the etching slope width is 50 µm in terms of a mask plane projection value as described above. Therefore, a mask extension value can be set up to 50 µm.

Figure 10D:
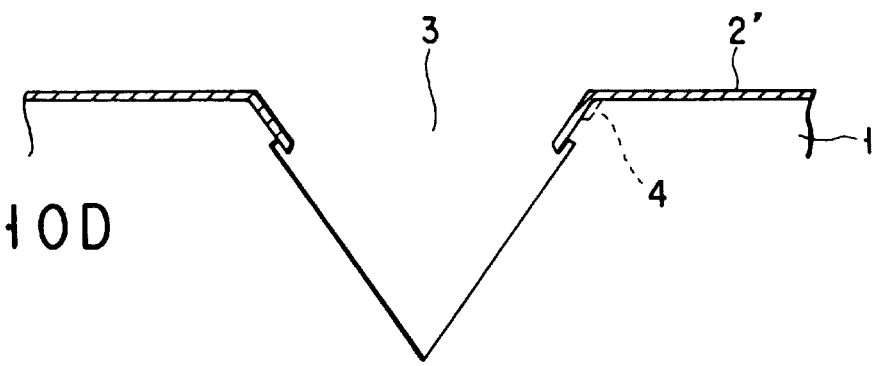
Figure 11A:
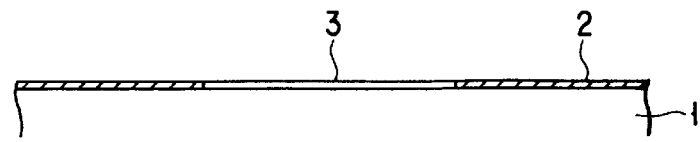
FIGS. 11A to 11F are sectional views showing fabrication processes of the single crystal component of the second embodiment of the present invention.
Figure 11B:
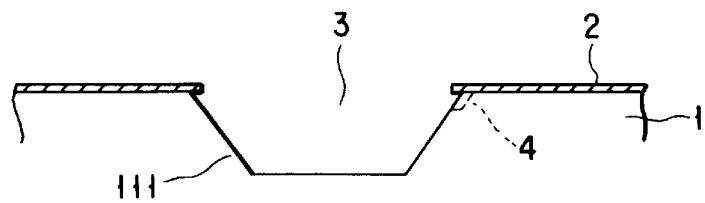
Figure 11C:
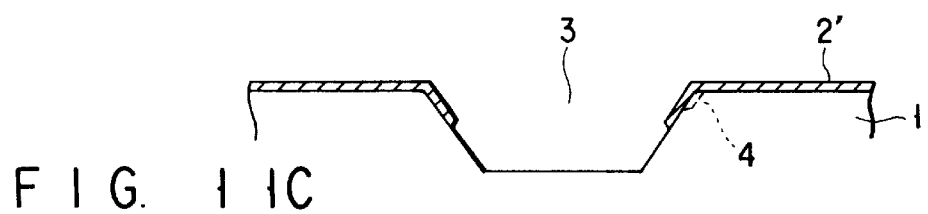
Figure 11D:
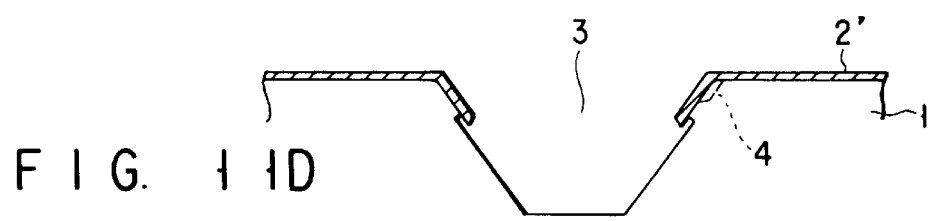
Figure 11E:
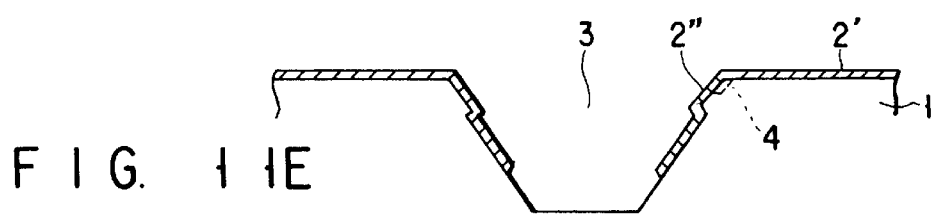
Figure 11F:
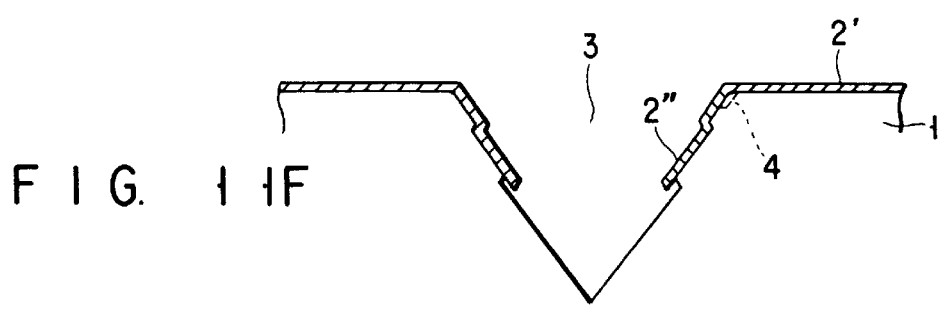

Then, the second anisotropic etching, that is, deep etching is performed to complete grooving (FIG. 10D). In the case of this deep etching, a mask material and etching solution to be used except the structure of the mask can use those of normal anisotropic etching and it is possible to perform deeper etching as long as the time is kept within the mask durable time determined by the etching selectivity of the mask. In the case of this etching, the undercut etching at the bottom of the mask occurs similarly to the case of the normal etching providing a mask for (100) plane. However, the retreat value in the case of the undercut etching is smaller than the case of providing a mask for normal (100) plane and it comes to approx. 80% of the value when providing a mask for normal (100) plane. Moreover, the undercut progress direction is the direction along (111) plane initially formed. Therefore, the pattern width of a V-groove shape is not fluctuated due to the undercut at the bottom of the mask 2'.

This represents that, when the pattern of the second mask is slightly deviated from the pattern of the first anisotropic etching, the position of the undercut region of the second mask is deviated but the effective pattern width and pattern position of a V-groove shape are not fluctuated. That is, the pattern width of the V-groove is determined by the first anisotropic etching and the second mask controls abnormal etching and realizes deep etching. The second mask self-aligns with the first mask (pattern). However, this represents that the second mask is a passive mask which does not determine any pattern.

As the pattern condition of the second mask 2', the pattern boundary must be present in a plane formed through the first anisotropic etching and having a small etching rate (that is, must be present in (111) plane in the case of FIG. 10C). Moreover, in FIG. 10D, a crystal plane with which a mask contacts nearby an end of the mask is (111) plane and crystal planes formed due to undercut (that is, the slope of a V-groove and an end face of the undercut connecting the V-groove slope from the bottom of the mask) are also (111) planes, that is, (111) equivalent planes in the crystallographically accurate expression. Therefore, even if a slight etching defect is produced, these relative shapes do not collapse. Therefore, the fluctuation factor of a V-groove shape in the second anisotropic etching is only the etching of a V-groove slope and thus, it is possible to precisely perform the design and control for V-groove working by minutely computing the etching rate of (111) crystal plane of Si.

Thus, it is possible to execute the anisotropic etching of a single crystal substrate. In the case of the groove for holding a guide pin having a diameter of 700 μm shown in the section of Related Art as an example of applying this method, it is possible to set the first and second masks so that the width of a V-groove slope on the portion having no mask in FIG. 10D when extending the slope up to the surface comes to 857 μm and perform the first anisotropic etching up to a depth of 70 μm and the second anisotropic etching up to a depth of 450 μm. As the result of performing test fabrication by the present inventor et al., a very excellent result such as a percent non-defective of 95% or more was obtained in each case after repeating the test fabrication of simultaneously treating ten wafers five times by applying the present invention. Moreover, most defective samples were those having pattern defects on resist or an $SiO_2$ mask. As the result of excluding the samples having these pattern defects, an etching yield of almost 100% was obtained.

In the case of the above test fabrication, the etching cross-sectional shape shows an inverse trapezoid because the depth of a groove does not reach the summit of a v-groove (approx. 606 μm in depth). Therefore, it was difficult to accurately measure a V shape by the observation from the surface and thus, the shape was evaluated by the observation of the cross section obtained by cracking a wafer. As a result, the width of a V-groove slope when extending the slope up to the surface or the fluctuation in the width between slopes when setting a specific depth was 2 to 3 μm. Thus, it is estimated that the etching accuracy is approx. 1 μm when considering the glass mask accuracy serving as the origin of a pattern, pattern forming accuracy of photolithography, and measurement accuracy of a groove width.

Therefore, the anisotropic etching of the present invention has an advantage that the working yield and working accuracy can be greatly improved compared to the relate art when performing deep etching of 300 μm or more.

Figure 16:
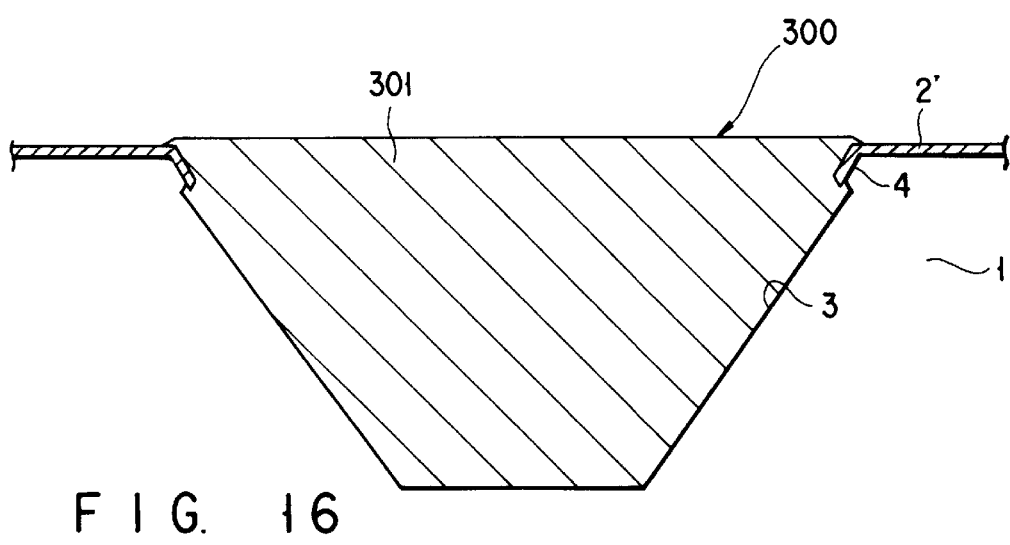
FIG. 16 is a sectional view showing an ion sensor using the single crystal component of the sixth embodiment of the present invention.

Moreover, the top of the groove 3 covered with the second mask 2' is left without being etched by the second anisotropic etching and remains as a kind of protrusion. This protrusion provides the following advantage. That is, in the case of an ion sensor constituted by embedding a macromolecular resin for detecting ions in a groove, the protrusion shows a function for preventing the macromolecular resin from being omitted. An example of the ion sensor is described later (FIG. 16). When inserting a guide pin into a groove and fixing it by an adhesive, adhesion can be further secured by the above protrusion. Moreover, though the pattern opening of the first embodiment is rectangular, it can be an opening having another shape.

Second Embodiment

FIGS. 11A to 11F are sectional block diagrams showing the second embodiment of the present invention. FIGS. 11A to 11D of the second embodiment are the same as FIGS. 10A to 11D of the first embodiment. The second embodiment is obtained by adding the step of FIG. 11E for further forming a third mask 2" on the single crystal Si substrate and the step of FIG. 11F for performing the third anisotropic etching for finally forming a V-groove shape to the first embodiment. The second embodiment realizes a final etching depth through anisotropic etching three times when performing further deep etching. Therefore, the second embodiment can also form the same V-groove shape as that of the first embodiment by eliminating abnormal etching.

Third Embodiment

Figure 1A:
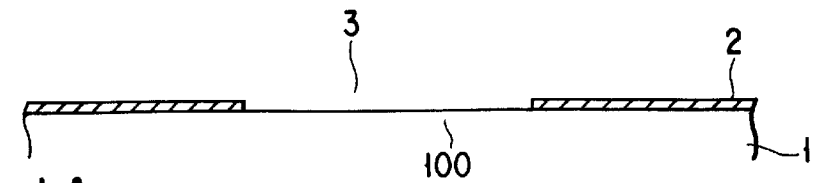
FIGS. 1A to 1C are process sectional views showing an working example according to a conventional anisotropic etching method.
Figure 1B:
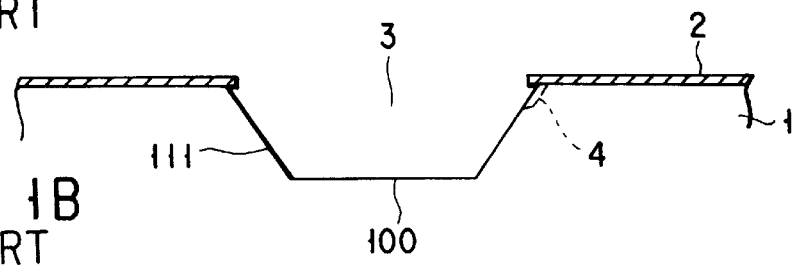
Figure 1C:
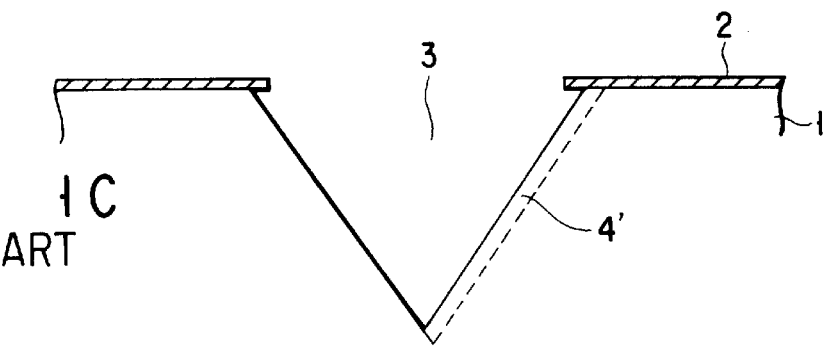
Figure 8A:
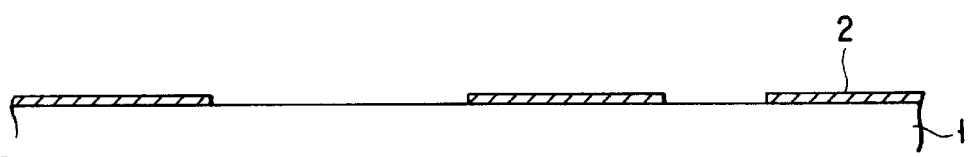
FIGS. 8A to 8C are process sectional views showing an example of simultaneously etching two grooves by the related art.
Figure 8B:
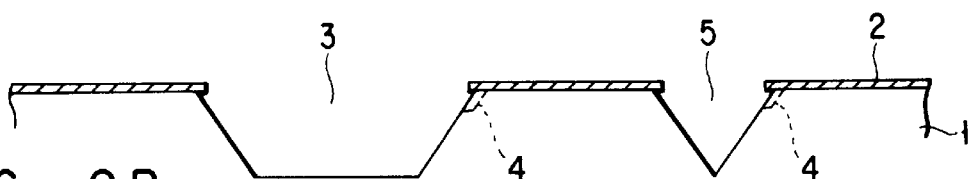
Figure 8C:
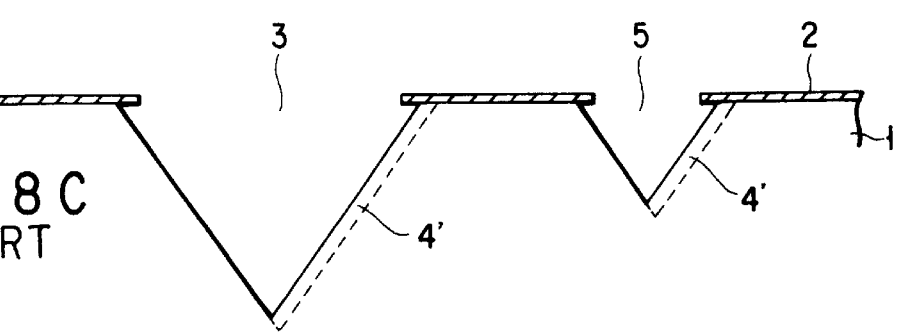
Figure 7:
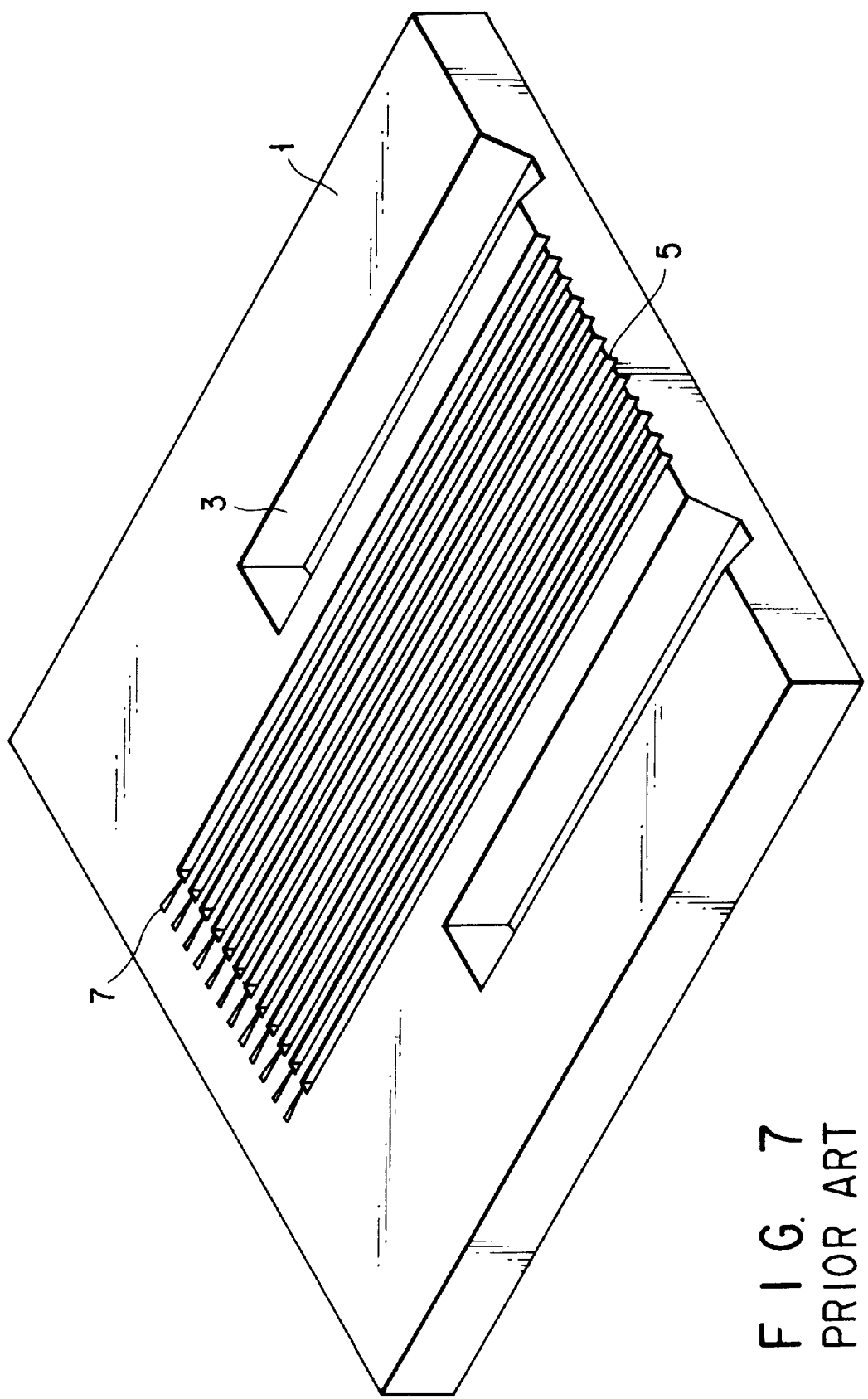
FIG. 7 is a perspective view showing an optical mounting component using anisotropic etching.
Figure 9A:
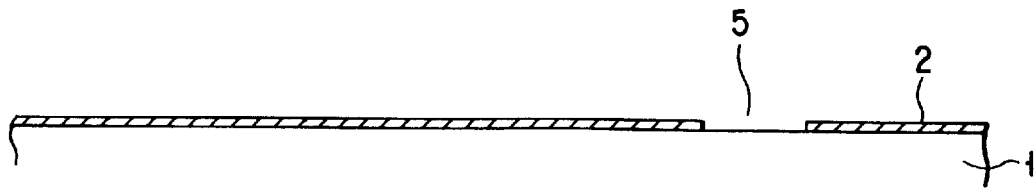
FIGS. 9A to 9D are process sectional views showing another example of simultaneously etching two grooves by the related art.
Figure 9B:
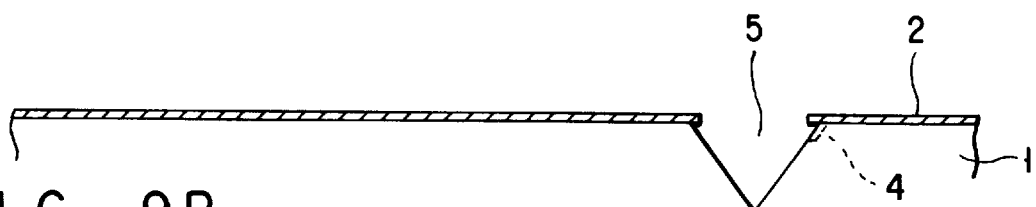
Figure 9C:
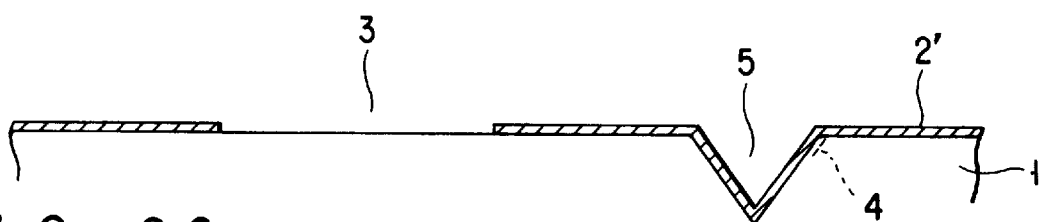
Figure 9D:
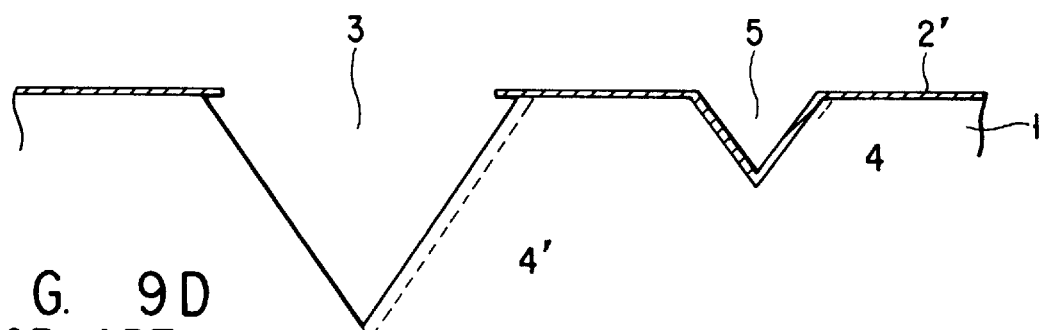
Figure 12A:
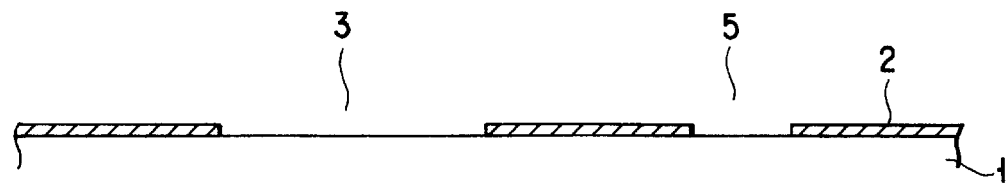
FIGS. 12A to 12D sectional views showing fabrication processes of the single crystal component of the third embodiment of the present invention.

FIGS. 12A to 12D are sectional block diagrams showing the third embodiment of the present invention, which is obtained by applying the present invention to the example of forming a groove for holding an optical fiber with a diameter of 125 μm and a groove for holding a guide pin with a diameter of 700 μm on the same substrate as shown in FIGS. 8A to 8C. In FIG. 12A, symbol 1 denotes a single crystal Si substrate having the surface of (100) plane, 2 denotes a thermally-oxidized $SiO_2$ mask (first mask), 3 denotes a guide-pin holding groove, and 5 denotes an optical-fiber holding groove.

Figure 12B:
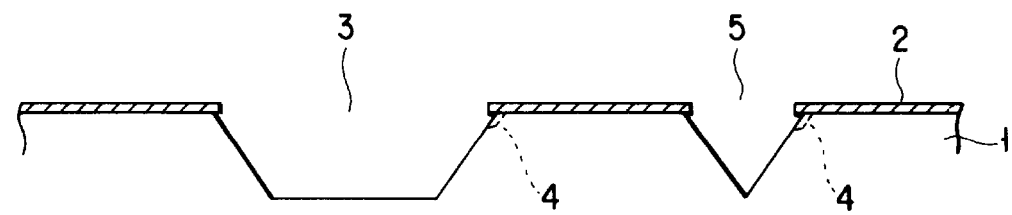

First, similarly to the case of the first embodiment, the first mask 2 is formed (FIG. 12A) and then, the first anisotropic etching is applied (FIG. 12B). In this case, when the etching depth is 108 μm or more, the optical-fiber holding groove 5 is completely formed into a V shape as illustrated. However, because the optical fiber has a radius of 62.5 μm, the etching depth requires 70 μm or more but it is unnecessary to continue etching until the groove is completely formed into a V shape. It is possible to determine the etching depth judging from an abnormal-etching occurrence state.

Figure 12C:
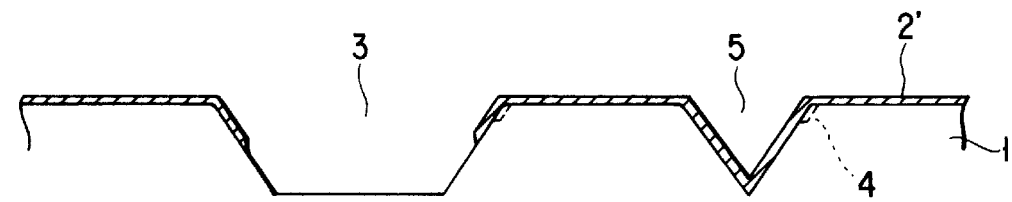
Figure 12D:
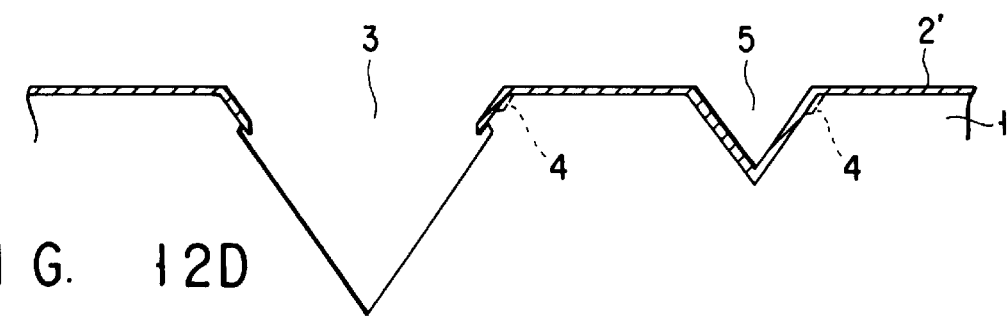

Then, a second mask 2' is formed. Similarly to the case of the first embodiment, the guide-pin holding groove 3 is formed so that the boundary of a pattern opening is located on the etching slope formed through the first anisotropic etching. Moreover, the optical-fiber holding groove 5 is left so as to keep the shape because the optical-fiber holding groove 5 does not require the second anisotropic etching (FIG. 12C). Finally, the second anisotropic etching is applied to complete the etching (FIG. 12D). In this case, as illustrated, a depth of approx. 600 μm is necessary to completely form the guide-pin holding groove 3 into a V shape. As described above, however, a depth of 350 μm of the guide-pin radius or more is enough. Therefore, a depth of approx. 400 μm is enough because shallow etching is better by considering the substrate strength and the like.

The optical mounting component (substrate) thus fabricated has high accuracy and yield of a deep groove as shown in the first embodiment and therefore, almost solves the problem of yield which is a problem of the related art.

In this case, though not shown in FIGS. 10A to 10D, FIGS. 11A to 11F, or FIGS. 12A to 12D, when the extension value of the second mask is extremely large in the case of a guide-pin holding groove to which the present invention is applied, the boundary of the second mask may reach the contact portion between an object to be held and a V-groove. A specific example of the above relative relation is described below by referring to FIG. 13.

Figure 13:
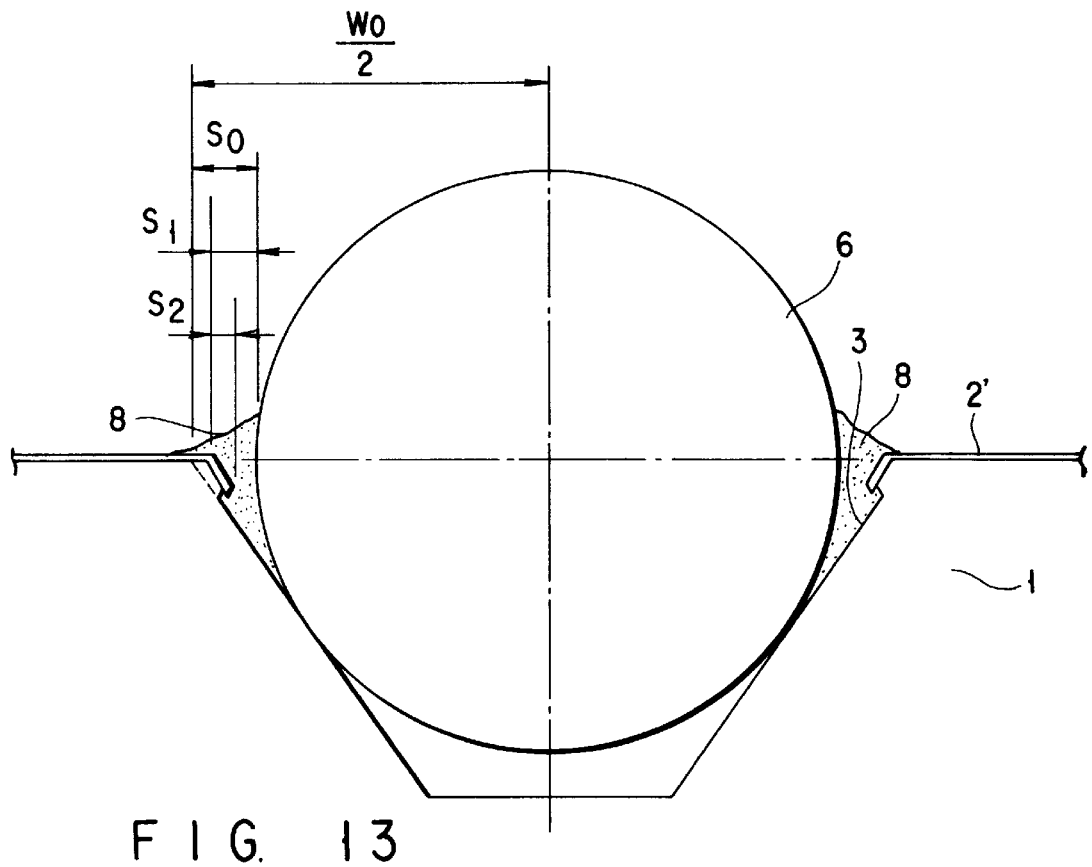
FIG. 13 is a sectional view showing a mounted state of an optical mounting component using a single-crystal component of the present invention.

FIG. 13 is a block sectional view showing a guide pin actually set to an etched guide-pin holding groove. In FIG. 13, symbol 1 denotes an Si substrate, 2' denotes a second mask, 6 denotes a guide pin, and 8 denotes an adhesive crammed between the guide pin 6 and the V-groove 3. Symbol W0 denotes the effective opening width of the V-groove 3, S0 denotes the distance between an effective opening end of the V-groove 3 and a guide-pin end, S1 denotes the distance between an actual opening end of the V-groove 3 and an guide-pin end, and S2 denotes the extension value of the second mask.

The distance between the distance S0 and the distance S1 is a distance obtained by projecting the step produced due to the second anisotropic etching of (111) plane on the surface. For example, when performing the second anisotropic etching for 300 μm with a KOH aqueous solution, a value of approx. 10 μm is obtained.

Moreover, when setting a guide pin with a diameter of 700 μm so that the center of the guide pin levels with the surface of the Si substrate, S0 comes to approx. 79 μm. When assuming that the difference between S0 and S1 is 10 μm, S1 comes to approx. 69 μm. As shown in FIG. 13, it is permitted that the extension value S2 of the second mask 2' is equal to or less than S1. In this case, when keeping S2 at 65 μm or less, there is no problem. As shown in the first embodiment, it is permitted that the extension value of the second mask 2' is approx. 20 μm and therefore, application of the present invention is possible enough.

Fourth Embodiment

Figure 14:
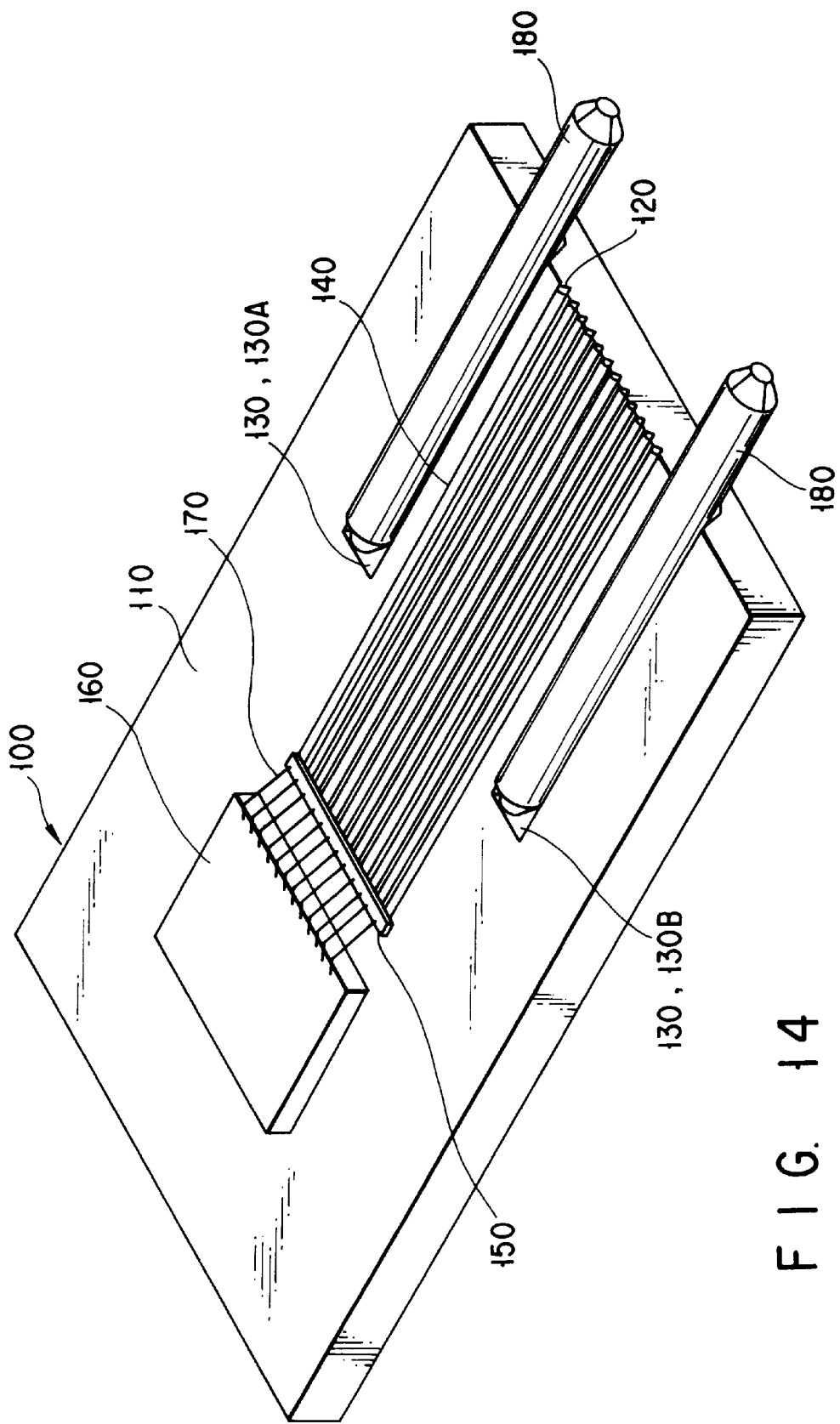
FIG. 14 is a perspective view showing the optical component of the fourth embodiment of the present invention.

An optical component using a signal crystal component obtained from the first, second, or third embodiment is described below as the fourth embodiment. That is, as shown in FIG. 14, the optical component 100 of this embodiment is provided with a single crystal component 110 according to the first, second, or third embodiment. The single crystal component 110 of this embodiment has first and second groove portions 120 and 130 formed by the method shown in the first, second, or third embodiment. The first groove portion 120 comprises a plurality of V-grooves, in which an optical fibers 140 is set. An optical device portion 150 serving as a photodetector array or light-emitting device array such as light-emitting diode array or semiconductor laser array is set on the single crystal component 110. The optical devices array is optically connected to the optical fibers portion 140. An integrated circuit element 160 is set on the single crystal component 110. The optical devices array and the integrated circuit element 160 are electrically connected each other by bonding wires 170. Moreover, the second groove portion 130 comprises V-grooves 130A and 130B provided for the right and left of the first groove portion 120 and a guide pin 180 is set to the V-grooves 130A and 130B respectively.

In the case of the optical component 100 of the fourth embodiment thus constituted, the optical fibers 140 and guide pins 180 are very accurately positioned to the very-accurately worked grooves 120 and 130. Thereby, light transfer between the optical fibers 140 and the optical devices array are securely performed and thus, it is possible to provide the optical component 100 in which an optical loss is greatly reduced.

Fifth Embodiment

Figure 15:
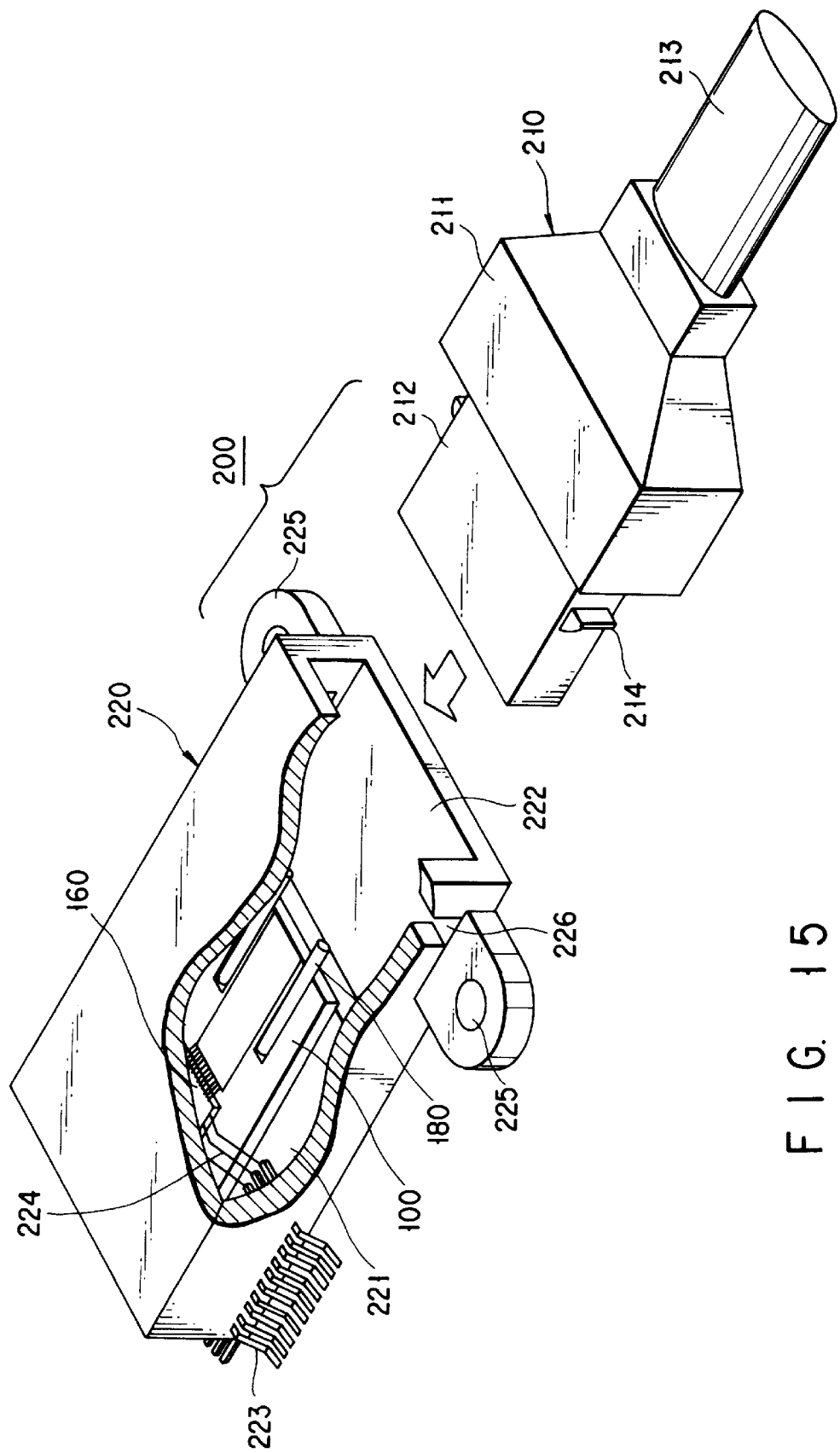
FIG. 15 is a perspective view showing the optical module of the fifth embodiment of the present invention.

An optical module using the optical component 100 obtained from the fourth embodiment is described below as the fourth embodiment. That is, as shown in FIG. 15, the optical module 200 of this embodiment is provided with a male connector 210 and a female connector 220. The male connector 210 is provided with a grip portion 211 to be gripped by a not-illustrated operator and an inserting portion 212. An optical fiber bundle 213 is connected to the grip portion 211. An end of the optical fiber bundle 213 is located at an end of the inserting portion 212.

The female connector 220 includes a storing portion 221 and a receiving portion 222. The optical component 100 obtained from the fourth embodiment is set to the storing portion 221. A terminal 223 is set in the storing portion 221 by passing through the inside and outside of the female connector 220. The terminal 223 and the integrated circuit element 160 of the optical component 100 are electrically connected each other by a bonding wire 224. The inserting portion 212 of the male connector 210 is inserted into the receiving portion 222. A fixing flange 225 is set outside of the male connector 220. Moreover, a locking pawl 214 is formed on the receiving portion 222 of the female connector 220. Furthermore, a locking-pawl 226 engaging with the locking pawl 214 of the male connector 210 is formed on the receiving portion 222 of the female connector 220. Furthermore, the guide pin 180 of the female connector 220 is inserted into a not-illustrated pin receiver formed on the inserting portion 212 of the male connector 210. The guide pin 180 and the pin receiver of the male connector 210 function as positioning members for inserting the inserting portion 212 of the male connector 210 into the receiving portion 222 of the female connector 220.

The optical module 200 of the fifth embodiment constituted as described above performs light transmission and light-electricity conversion at a high efficiency because of using the optical component 100 in which an optical loss is minimized.

Sixth Embodiment

An ion sensor 300 using the substrate 1 obtained from the first, second, or third embodiment is described below as the sixth embodiment. That is, as shown in FIG. 16, the ion sensor 300 of this embodiment is constituted by embedding a macromolecular resin 301 for detecting ions in the groove 3. In the case of the ion sensor 300, a protrusion 4 has a function for preventing the macromolecular resin 301 from being omitted.

The present invention is not restricted to the above-mentioned embodiments. The above embodiments use an Si substrate as a single crystal substrate. However, it is also possible to use a semiconductor substrate made of Ge or SiC or a dielectric substrate made of $Al_2O_3$ or $Si_3N_4$. Moreover, it is possible to properly change etching solutions in accordance with the substrate used. Furthermore, an etching method is not always restricted to the wet etching. The dry etching can be used when anisotropic etching is possible.

As described above, the present invention is characterized in which relatively deep anisotropic etching can be performed at a high accuracy and a high yield when applying anisotropic etching to a single crystal substrate and machining it. Thereby, because the present invention makes it possible to greatly expand the working range when the present invention is applied to work an optical mounting component and mass-produce high-accuracy low-cost machined parts, it has an advantage of realizing cost reduction and mass production of optical devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A single crystal component comprising:
    a single crystal substrate whose surface portion and depth direction are defined;
    a tapered groove formed on the surface portion of said single crystal substrate and having an opening and a cross sectional shape gradually narrowed along said depth direction; and
    a protrusion formed on said groove nearby the surface portion of said single crystal substrate.

2. The single crystal component according to claim 1, further comprising another tapered groove formed on said surface portion and said protrusion.

3. The single crystal component according to claim 1, wherein said single crystal substrate uses a single crystal Si substrate.

4. The single crystal component according to claim 1, wherein said single crystal substrate uses a semiconductor substrate made of Ge or SiC.

5. The single crystal component according to claim 1, wherein said single crystal substrate uses a dielectric substrate made of $AlO_3$ or $Si_3N_4$.

6. An optical component comprising:

a single crystal component provided with a single crystal substrate whose surface portion and depth direction are defined, a tapered groove portion formed on the surface portion of said single crystal substrate and having an opening and a cross-sectional shape gradually narrowed along said depth direction, and a protrusion formed on said groove portion nearby the surface portion of said single crystal substrate;

an optical fiber portion set to said groove portion;

a light-receiving element portion connecting with the end located on the surface portion of said optical fiber;

an integrated circuit element set to said surface portion; and a bonding wire for connect said light-receiving element with said integrated circuit element.

7. The optical component according to claim 6, wherein said groove portion is provided with a lot of grooves, said optical fiber portion is provided with a lot of optical fibers arranged in said grooves respectively, and said light-receiving element portion is provided with a lot of light-receiving elements connected to said grooves respectively.

8. The optical component according to claim 6, wherein said single crystal component is further provided with another tapered groove formed on said surface portion and said protrusion and a guide pin is set to said tapered groove.

9. An optical module comprising:

a single crystal component provided with a single crystal substrate whose surface portion and depth direction are defined, a tapered groove portion formed on the surface portion of said single crystal substrate having an opening and a cross-sectional shape gradually narrowed along said depth direction, and a protrusion formed on said groove portion nearby the surface portion of said single crystal substrate; an optical component provided with an optical fiber portion set to said groove portion, a light-receiving element portion connecting with an end located at the surface portion of said optical fiber, an integrated circuit element set to said surface portion, and a bonding wire for connecting said light-receiving element with said integrated circuit element; and a female connector provided with a connector housing having a storing portion for storing said optical component in said inside in which inside and outside are defined and an inserting portion, and a terminal whose one end is set to said storing portion and whose other end is set to the outside of said connector housing;

a male connector whose one end is inserted into said inserting portion; and an optical fiber cable whose front end is set to the front end of said inserting portion of said male connector and which is optically connected to said optical fiber portion.

10. The optical module according to claim 9, further comprising:

a locking pawl formed on said male connector; and a locking pawl receiver formed on the inserting portion of said female connector to receive said locking pawl.

11. The optical module according to claim 9, further comprising a flange set to the outside of said female connector.

12. A sensor comprising:

a single crystal substrate whose surface portion and depth direction are defined;

a tapered groove formed on the surface portion of the single crystal substrate and having a cross-sectional shape gradually narrowed along said depth direction;

a protrusion formed on said groove nearby the surface portion of said single crystal substrate; and a sensing member set to said groove portion.

13. The single crystal component according to claim 1, wherein said single crystal substrate uses a single crystal Si substrate.

14. The single crystal component according to claim 1, wherein said single crystal substrate uses a semiconductor substrate made of Ge or SiC.

15. The single crystal component according to claim 1, wherein said single crystal substrate uses a dielectric substrate made of $AlO_3$ or $Si_3N_4$.

* * * * *

UNITED STATES PATENT AND TRADEMARK OFFICE
CERTIFICATE OF CORRECTION

PATENT NO.: 5,980,119

DATED: November 9, 1999

INVENTOR(S)  Hideto Furuyama

It is certified that an error appears in the above-identified patent and that said Letters Patent is hereby corrected as shown below:

Claim 6, Column 13, line 22, "connect" should read --connecting--.

Signed and Sealed this

Eighteenth Day of July, 2000

Attest:

Q. TODD DICKINSON

Attesting Officer       Director of Patents and Trademarks